United States Patent
Calahan

(10) Patent No.: US 10,587,401 B2
(45) Date of Patent: Mar. 10, 2020

(54) SECURE HANDLING OF CUSTOMER-SUPPLIED ENCRYPTION SECRETS

(71) Applicant: salesforce.com, Inc., San Francisco, CA (US)

(72) Inventor: Patrick Calahan, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 110 days.

(21) Appl. No.: 15/477,776

(22) Filed: Apr. 3, 2017

(65) Prior Publication Data
US 2018/0287786 A1    Oct. 4, 2018

(51) Int. Cl.
H04L 9/08    (2006.01)
H04L 9/14    (2006.01)
H04L 9/32    (2006.01)

(52) U.S. Cl.
CPC .......... *H04L 9/0822* (2013.01); *H04L 9/083* (2013.01); *H04L 9/0825* (2013.01); *H04L 9/0861* (2013.01); *H04L 9/0894* (2013.01); *H04L 9/14* (2013.01); *H04L 9/3236* (2013.01); *H04L 2209/76* (2013.01)

(58) Field of Classification Search
CPC ..... H04L 9/0822; H04L 9/0825; H04L 9/083; H04L 9/0833; H04L 9/0861; H04L 9/0894; H04L 9/14; H04L 2209/76
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

*Primary Examiner* — Linglan E Edwards
(74) *Attorney, Agent, or Firm* — Schwabe Williamson & Wyatt

(57) ABSTRACT

An application server sends a public key from an asynchronous key-pair to a user system to encrypt a user encryption secret that forms part of a first encryption key. The application server uses a second encryption key provided by a key derivation server to encrypt a private key from the asynchronous key-pair. The application server then deletes the second encryption key to prevent decryption of the user encryption secret received from the user system. The application server receives the encrypted user encryption secret from the user system and sends a request to the key derivation server to re-encrypt the user encryption secret. The key derivation server uses a key encryption secret to generate the second encryption key and decrypt the private key. The key derivation server uses the decrypted private key to decrypt the user encryption secret and then re-encrypts the first encryption secret to prevent decryption by the application server.

20 Claims, 7 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,924,720 B2 * | 12/2014 | Raghuram | H04L 9/0825 713/150 |
| 9,070,112 B2 * | 6/2015 | Glover | G06Q 10/101 |
| 9,252,946 B2 * | 2/2016 | Ranghuram | H04L 9/0825 |
| 9,479,330 B2 * | 10/2016 | Anzai | H04L 9/0861 |
| 10,091,648 B2 * | 10/2018 | Vanderveen | H04L 9/083 |
| 10,187,207 B2 * | 1/2019 | Hayashi | H04L 9/14 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0065905 A1* | 3/2008 | Salessi ............... G06F 21/31 713/193 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0235801 A1* | 9/2011 | Peterka ............ H04N 21/2343 380/200 |
| 2011/0247051 A1 | 10/2011 | Bulumulla |
| 2012/0042218 A1 | 2/2012 | Cinarkaya |
| 2012/0054491 A1* | 3/2012 | Tippett ............... H04L 9/3213 713/168 |
| 2012/0233137 A1 | 9/2012 | Jakobson et al. |
| 2012/0290407 A1 | 11/2012 | Hubbard et al. |
| 2012/0317414 A1* | 12/2012 | Glover ............... G06Q 10/101 713/165 |
| 2013/0067213 A1* | 3/2013 | Liu ..................... H04L 9/0819 713/150 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0319151 A1* | 11/2015 | Chastain ............ H04W 12/04 713/171 |
| 2015/0381575 A1* | 12/2015 | Bhargav-Spantzel ........... H04L 63/0428 713/168 |
| 2017/0195298 A1* | 7/2017 | Brand ............... H04L 63/0435 |

* cited by examiner

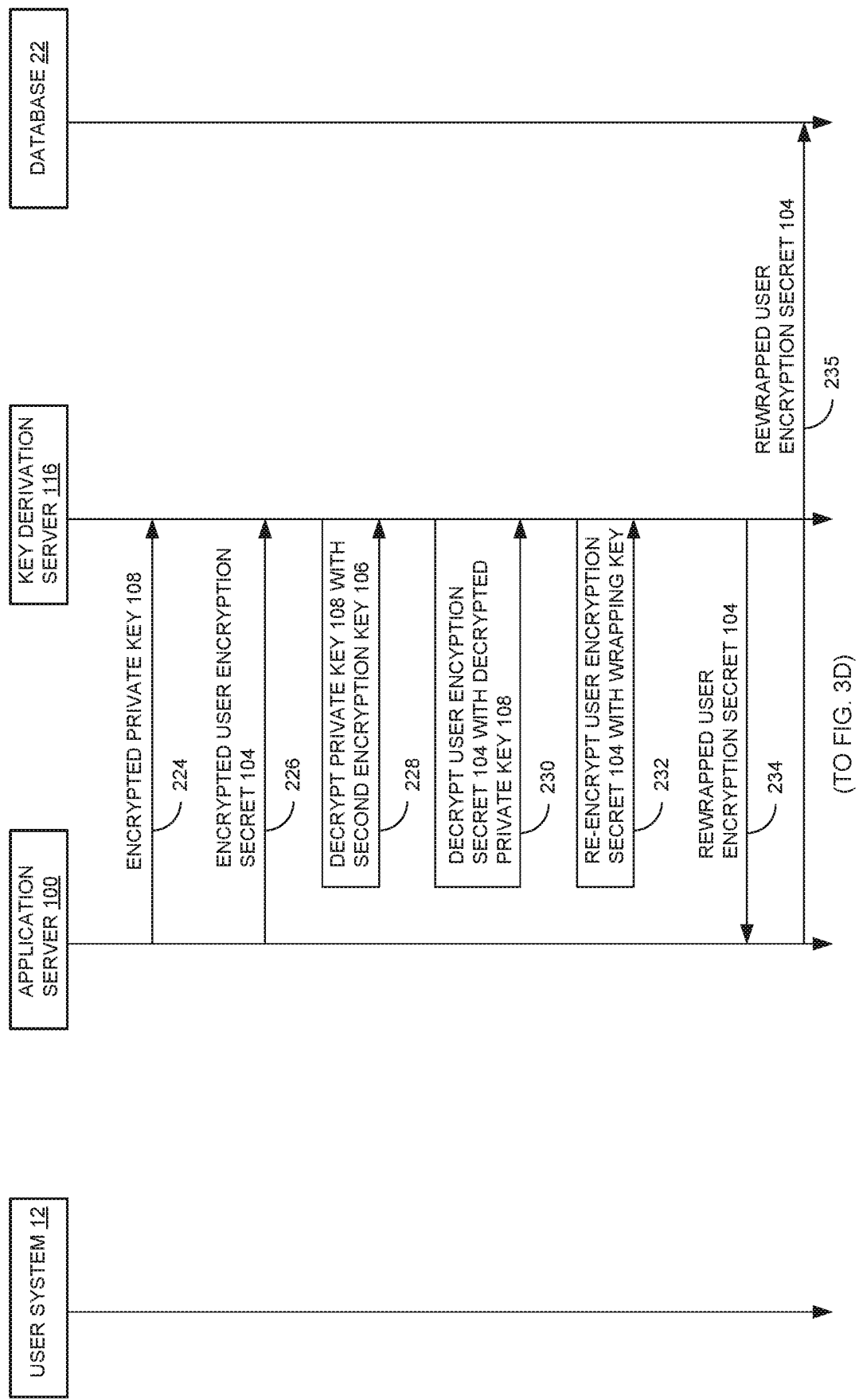

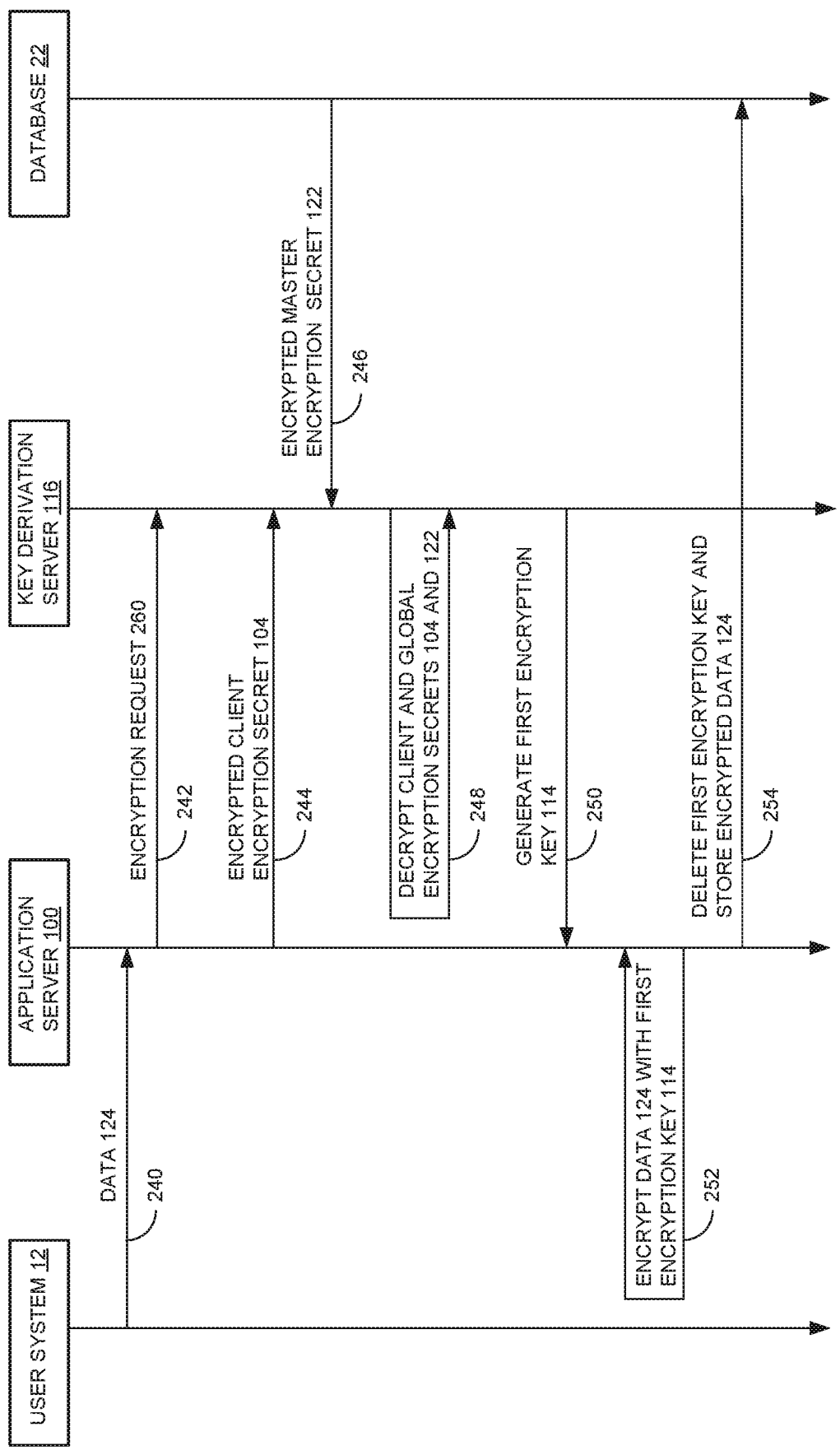

SECURE HANDLING OF CUSTOMER-SUPPLIED ENCRYPTION SECRETS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to secure handling of user-supplied encryption key secrets

BACKGROUND

Encryption systems may use fragmented encryption keys. A first portion of the encryption key may be referred to as a master encryption secret known only by the database system. A second portion of the encryption key may be associated with different users. The encryption system uses the encryption key formed by the two encryption secrets to encrypt data for an associated user. The encrypted data is then stored in a database. The encryption system uses the encryption key to then decrypt the stored data prior to sending the data to the user.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3C shows an example process for re-encrypting a user encryption secret.

FIG. 3D shows an example process for using the user encryption secret to encrypt data.

DETAILED DESCRIPTION

Figure 1A:
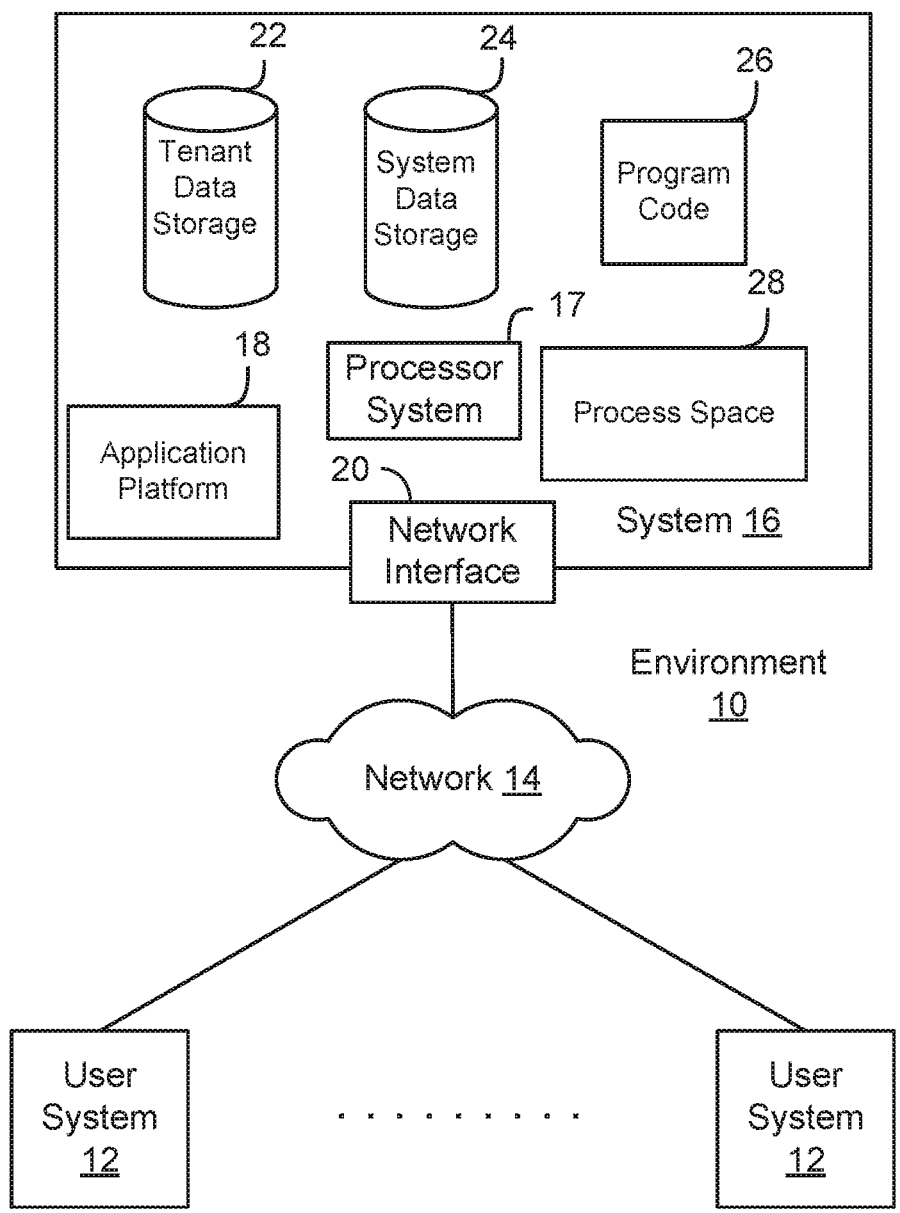
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

1. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as teed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a. LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations"), According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

Figure 1B:
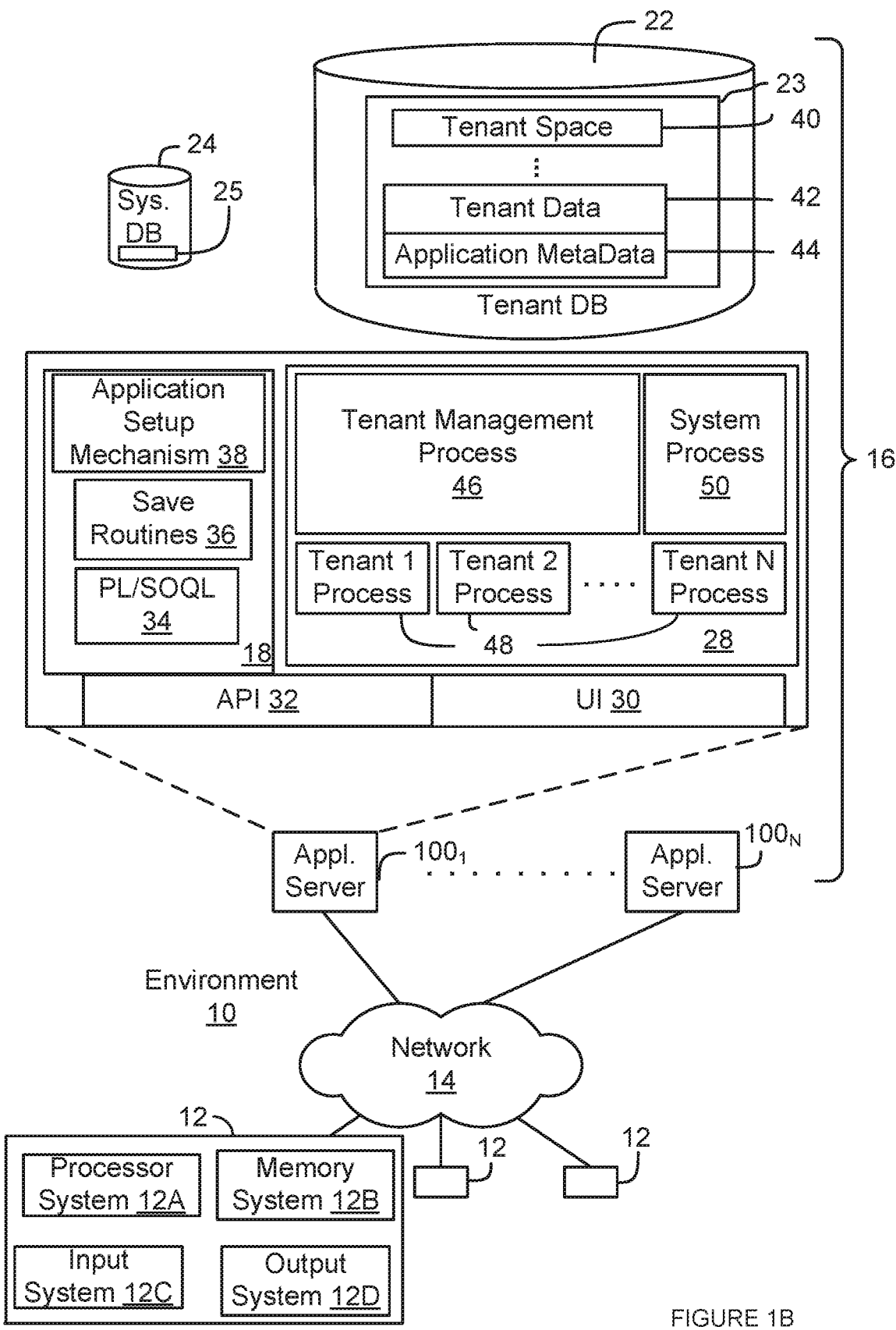
FIG. 1B shows a block diagram of example implementations of elements of FIG. 1A and example interconnections between these elements according to some implementations.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.), FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Secure Handling of User-Supplied Encryption Secrets

An application server sends a public key from an asynchronous key-pair to a user system to encrypt a user encryption secret that forms part of a first encryption key. The application server uses a second encryption key provided by a key derivation server to encrypt a private key from the asynchronous key-pair. The application server then deletes the second encryption key to prevent decryption of the user encryption secret received from the user system.

The application server receives the encrypted user encryption secret from the user system and sends a request to the key derivation server to re-encrypt the user encryption secret. The key derivation server uses a key encryption secret to generate the second encryption key and decrypt the private key. The key derivation server uses the decrypted private key to decrypt the user encryption secret and then re-encrypts the first encryption secret to prevent decryption by the application server.

Figure 2:
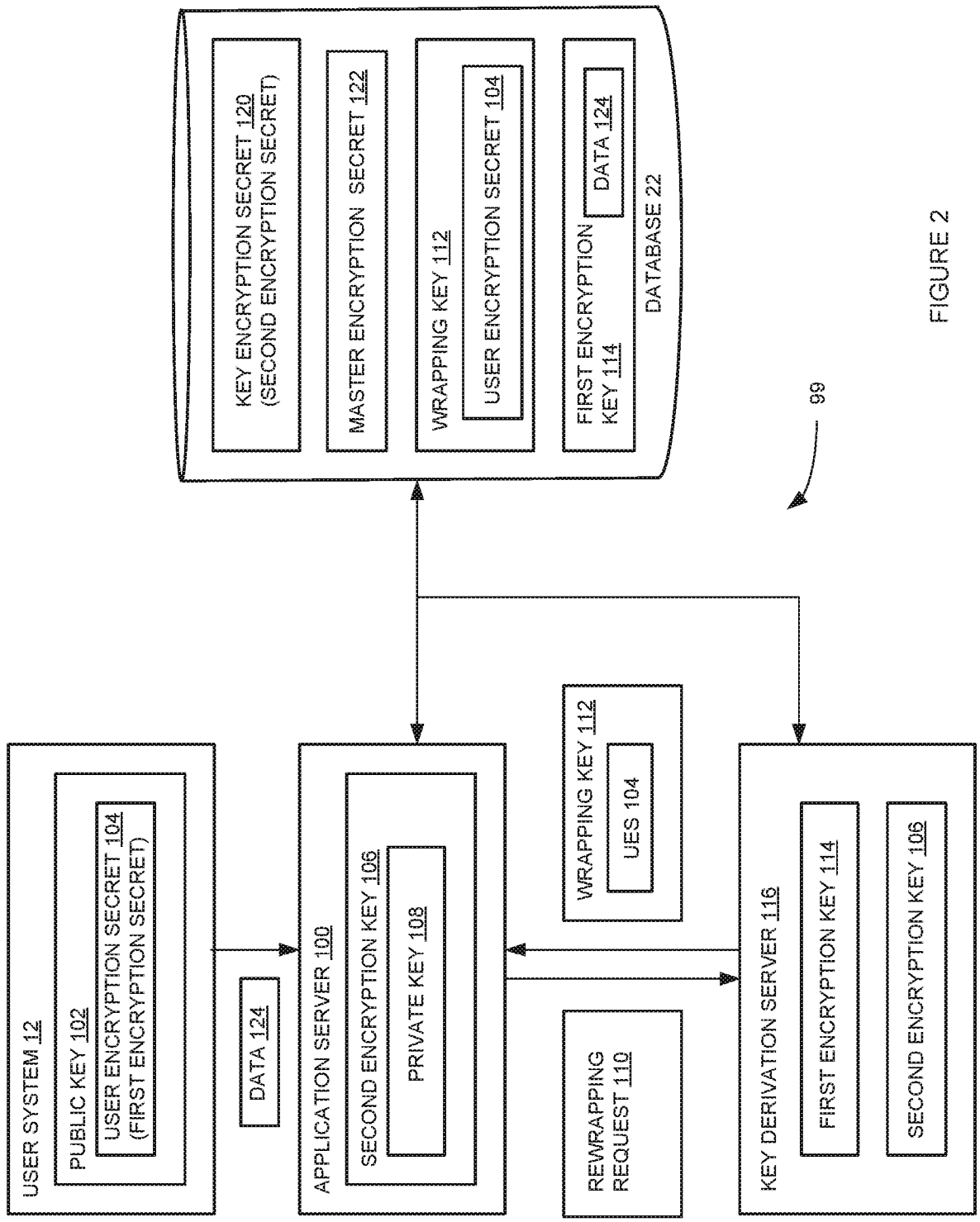
FIG. 2 shows an example encryption system for secure handling of user-supplied encryption secrets.

FIG. 2 shows an example encryption system 99 that securely transfers user supplied encryption secrets. In one example, key derivation server 116, application server 100, and database 22 may operate within the database system 16 described above. As described above, application server 100 may be any combination of hardware and/or software that transmits and receives data 124 to and from user systems 12.

Key derivation server 116 may operate independently from application server 100 and may not be directly accessible by user systems 12. Key derivation server 116 also may only temporarily store certain encryption keys and other encryption information. Thus, key derivation server 116 may by highly resistant to security breaches. In one example, application server 100 may receive encryption information from key derivation server 116 via application programmers interface (API) calls. Application servers 100 and key derivation servers 116 are generally known to those skilled in the art and their general operation is therefore not described in further detail A multi-part first encryption key 114 is used to encrypt data 124 received from user system 12. First encryption key 114 is formed from two or more encryption secrets. A first portion of the encryption key 114 may be associated with user system 12. A second portion of encryption key 114 may only be only accessed and known by key derivation server 116.

To increase security, user system 12 may generate a user encryption secret 104 that forms a first part of first encryption key 114. User encryption secret 104 is alternatively referred to as a first encryption secret or a first fragment of first encryption key 114.

In order to securely transport user encryption secret 104 to application server 100, user system 12 or application server 100 may create a certificate. The certificate may be self-signed or signed by a certification authority (CA). The certificate provides an asymmetric key-pair that includes a public key 102 and a private key 108.

In one example, user system 12 may use a random 256-bit secret value as user encryption secret 104. User system 12 may download the certificate from application server 100 and extract public key 102. User system 12 then may encrypt user encryption secret 104 using public key 102.

As described in further detail below, key derivation server 116 later combines user encryption secret 104 with a master encryption secret 122 to create first encryption key 114. Application server 100 then uses first encryption key 114 to encrypt data 124 from user system 12 prior to storing the data in database 22. First encryption key 114 is also referred to as a first platform encryption key (PEK).

User encryption secret 104 is encrypted with public key 102 and can only be decrypted with corresponding private encryption key 108. To prevent decryption by application server 100, private key 108 is further encrypted with a second two-part encryption key 106 alternatively referred to as a second platform encryption key (PEK). Application server 100 cannot decrypt private key 108 after encryption with second encryption key 106. Without the ability to decrypt private key 108, application server 100 cannot decrypt user encryption secret 104, generate first encryption key 114, or decrypt any data in database 22 encrypted with first encryption key 114. This protects encrypted data in database 22, from security attacks through application server 100. In one example, encrypted private key 108 is stored in database 22.

Application server 100 may send a re-wrapping request 110 to key derivation server 116. Re-wrapping request 110 may include user generated encryption secret 104 encrypted with public key 102. Re-wrapping request 110 also may include private key 108 encrypted with second encryption key 106.

Encryption is alternatively referred to as wrapping and re-encryption of user encryption secret 104 is alternatively referred to as re-wrapping. Wrapping keys generally refer to encryption keys that can only be accessed by key derivation server 116 and cannot be accessed or decrypted by application server 100.

In response to rewrapping request 110, key derivation server 116 may decrypt private key 108 with the two-part second encryption key 106. In one example, second encryption key 106 may include both a key encryption secret 120 (second encryption secret) and a master encryption secret 122. Key encryption secret 120 and master encryption secret 122 may be random numbers only known by key derivation server 116. Both key encryption secret 120 and master encryption secret 122 may be encrypted by key derivation server 116 with wrapping keys to prevent decryption by application server 100.

Key derivation server 116 uses the wrapping keys to decrypt and combine together key encryption secret 120 and master encryption secret 122 to form two-part second encryption key 106. Key derivation server 116 uses second encryption key 106 to decrypt private key 108 and then uses decrypted private key 108 to decrypt user encryption secret 104.

Key derivation server 116 re-encrypts (re-wraps) user encryption secret 104 with wrapping key 112 only available to key derivation server 116 to prevent decryption by application server 100. Key derivation server 116 sends re-encrypted (rewrapped) user encryption secret 104 back to application server 100 for storing in database 22. In one example, rewrapping of user encryption secret 104 occurs within key derivation server 116, rather than in the application server 100, and cannot be accessed in the clear by any other host.

In one example, user system 12 may perform a hash operation on unencrypted user encryption secret 104. Key derivation server 116 also may perform a hash operation on user encryption secret 104 while in the clear after being decrypted with private key 108. Both user system 12 and key derivation server 116 may send the hash values to application server 100. If the two hash values match, application server 100 may send a message to user system 12 indicating the successful storage of re-encrypted user encryption secret 104 in database 22.

At a later time, user system 12 may send data 124 to application server 100 to store in database 22. User system 12 may direct application server 100 to encrypt the data. For example, user system 12 may designate certain fields in certain records for encryption, such as fields for social security numbers or credit card numbers.

In response to the encryption request, application server 100 may send user encryption secret 104 from database 22 to key derivation server 116. Key derivation server 116 may decrypt and combine user encryption secret 104 with master encryption secret 122 to generate first encryption key 114. Key derivation server 116 may use the same, or different, master encryption secrets 122 for generating first encryption key 114 and second encryption key 106. Key derivation server 116 may send first encryption key 114 to application server 100.

Application server 100 uses first encryption key 114 to encrypt and store data 124 in database 22. Application server 100 then deletes first encryption key 114 preventing hackers into application server 100 from decrypting data 124.

To decrypt data 124, application server 100 sends a request to key derivation server 116 along with encrypted user encryption secret 104. Key derivation server 116 generates first encryption key 114 by decrypting and combining user encryption secret 104 and master encryption secret 122. Key derivation server 116 sends first encryption key 114 to application server 100 to decrypt and send stored data 124 to user system 12.

Figure 3A:
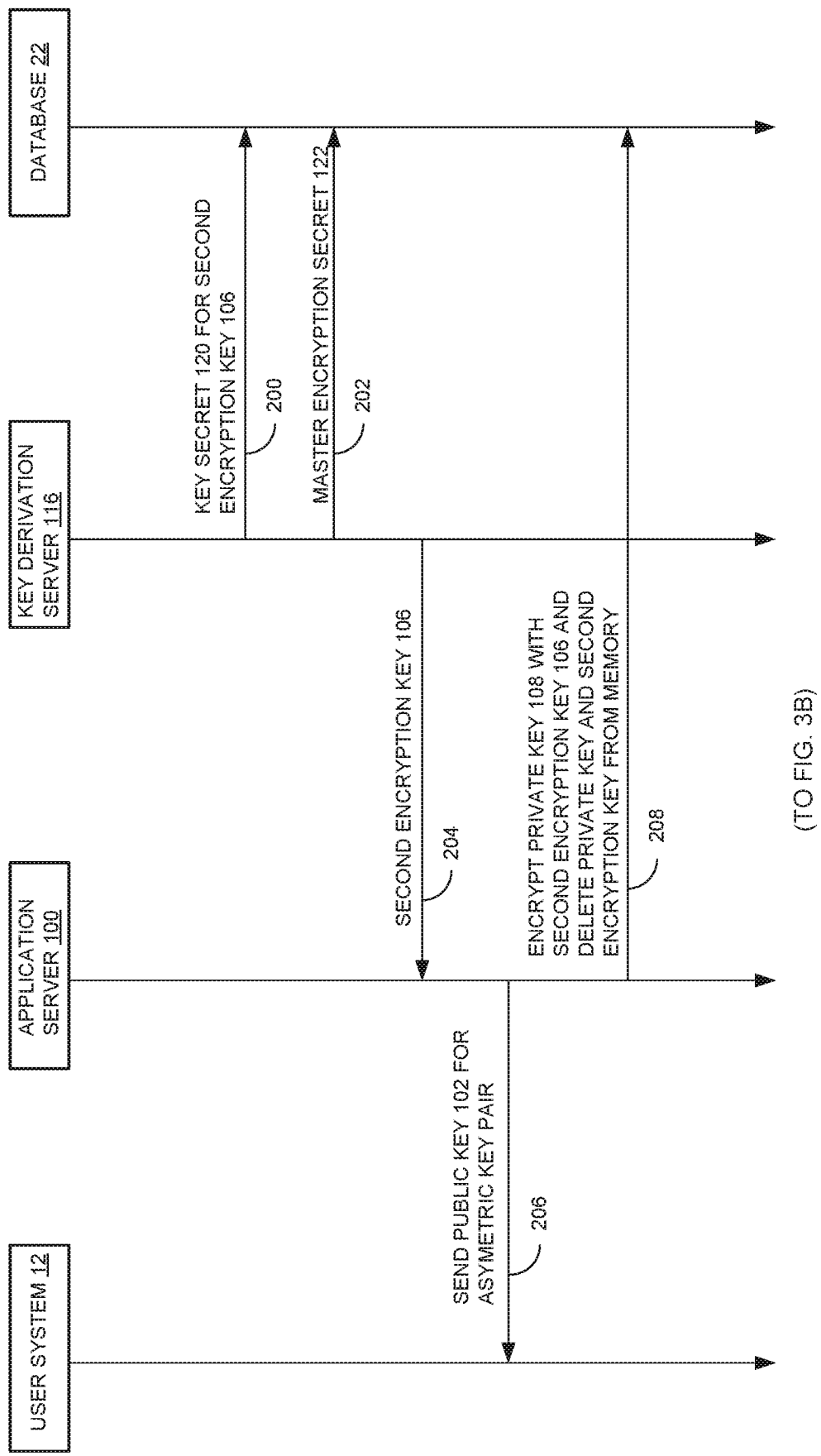
FIG. 3A shows an example process for encrypting a private key to prevent decryption of a user encryption secret.

FIGS. 3A-3D show in more detail the encryption protocol used by the encryption system to securely handle encryption secrets. FIG. 3A shows an example process for encrypting a private key. In operation 200, key derivation server 116 may generate a key encryption secret 120 for generating second encryption key 106. In operation 202, key derivation server 116 also may generate or obtain master encryption secret 122 for generating second encryption key 106. As explained above, second encryption key 106 may include two different portions that are separately encrypted and stored in database 22.

In operation 204, key derivation server 116 may send the second encryption key 106 to application server 100. As mentioned above, application server 100 may venerate an asymmetric key-pair that includes a public key and a private key. In operation 206, application server 100 may send the public key from the asymmetric key-pair to user system 12.

In operation 208, application server may encrypt private key 108 from the asymmetric key-pair with second encryption key 106 and store encrypted private key 108 in database 22. Application server 100 then deletes private key 108 and second encryption key 106 from local memory.

Figure 3B:
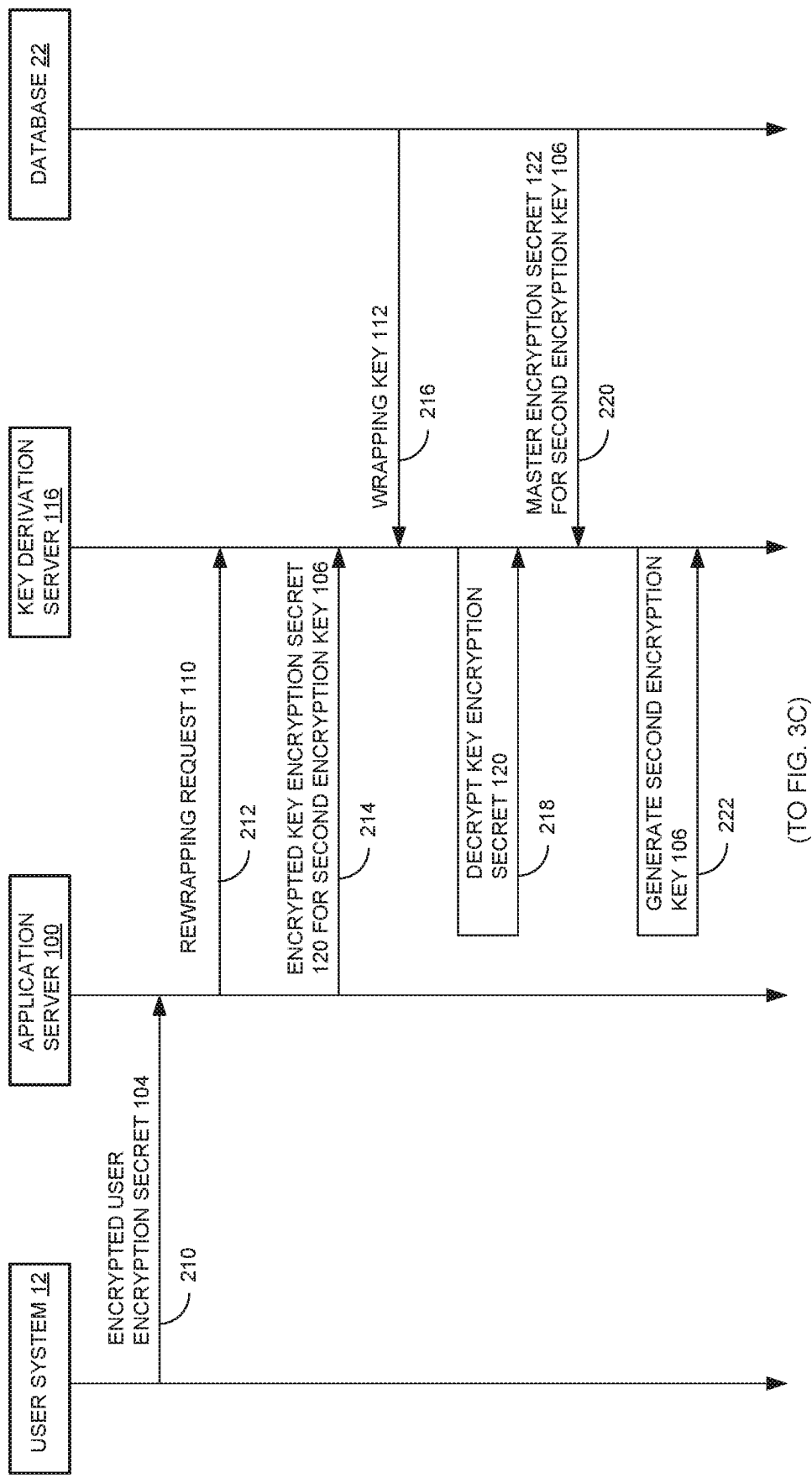
FIG. 3B shows an example process for generating an encryption key for decrypting an encrypted private key.

FIG. 3B shows example operations for regenerating the second encryption key after a re-wrapping request. In operation 210, user system 12 sends application server 100 user encryption secret 104 encrypted with the public key from the asymmetric key-pair. Application server 100 cannot decrypt user encryption secret 104 since private key 108 from the asymmetric key-pair is now encrypted with second encryption key 106.

In operation 212, application server 100 sends rewrapping request 110 to key derivation server 116 and in operation 214 sends key encryption secret 120 from database 22 to key derivation server 116. Key derivation server 116 may have previously encrypted key encryption secret 120 with a wrapping key to prevent decryption by application server 100. Again, key encryption secret 120 is one of the two encryption secret fragments that form second encryption key 106.

In operation 216, key derivation server 116 may obtain the wrapping key and in operation 218 may use the wrapping key to decrypt key encryption secret 120. In operation 220, key derivation server 116 may obtain master encryption secret 122 for second encryption key 106. Key derivation server 116 also may have previously encrypted master encryption secret 122 with a wrapping key. In operation 222, key derivation server 116 combines key encryption secret 120 with decrypted master encryption secret 122 to generate second encryption key 106.

FIG. 3C shows example operations for rewrapping the user encryption secret. In operation 224, application server 100 may obtain and send encrypted private key 108 from database 22 to key derivation server 116. In operation 226, application server 100 may send user encryption secret 104 encrypted with public key 102 to key derivation server 116.

In operation 228, key derivation server 116 uses second encryption key 106 generated above in FIG. 3B to decrypt private key 108. Recall private key 108 is the second part of the public-private asymmetric key-pair and the public key was previously used by user system 12 to encrypt user encryption secret 104. In operation 230, key derivation server 116 uses decrypted private key 108 to decrypt user encryption secret 104, At this point, user encryption secret 104 is decrypted and in-the-clear. As mentioned above, key derivation server 116 may perform a hash operation on user encryption secret 104 and send the hash value to application server 100. In operation 232, key derivation server 116 re-encrypts (re-wraps) user encryption secret 104 with a wrapping key unknown to application server 100.

In operation 234, encryption sends re-wrapped user encryption secret 104 to application server 100. Application server 100 may compare the hash value for user encryption secret 104 generated by key derivation server 116 with a hash value generated by user system 112 for user encryption secret 104. If the two hash values match, application server 100 in operation 235 may store rewrapped user encryption secret 104 in database 22 and send a message to user system 12 indicating successfully storage. Thus, application server 100 never has in-the-clear unencrypted access to user encryption secret 104 when sent from user system 12 to key derivation server 116 or when re-encrypted by key derivation server 116 and stored in database FIG. 3D shows example operations for encrypting data using the user encryption secret. In operation 240, user system 12 may send data 124 to application server 100 for encryption. As mentioned above, user system 12 may configure certain fields in selected records for encryption. In operation 242, application server 100 may receive data 124 associated with one of the configured fields and send an encryption request to key derivation server 116.

In operation 244, application server 100 may send encrypted client encryption secret 104 from database 22 to key derivation server 116. As explained above, application server 100 may not have access to the wrapping key used by key derivation server 116 to re-encrypt client encryption secret 104.

In operation 246, key derivation server 116 may download master encryption secret 122 that forms the second part of first encryption key 114. Key derivation server 116 also may have previously encrypted master encryption secret 146 with a wrapping key.

In operation 248, key derivation server 116 uses the wrapping keys to decrypt client encryption secret 104 and master encryption secret 122. In operation 250, key derivation server 116 combines the decrypted secrets 104 and 122 together to form and send first encryption secret 114 to application server 100.

In operation 252, application server 100 uses first encryption key 114 to encrypt data 124. In operation 254, application server 100 deletes first encryption key 114 from local memory and stores encrypted data 124 in database 22. A similar process is used to decrypt and send data 124 back to user system 12. Thus, the encryption scheme described above prevents unauthorized hackers into application server 100 from decrypting data 124.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A database system for re-encrypting a portion of an encryption key received by an application server from a user system, the database system comprising:
   a hardware processor configured to:
   at a second server, receive a request from the application server to re-encrypt a first encryption secret, the first encryption secret generated and encrypted by the user system as part of a first encryption key;
   at the second server, receive a private key encrypted with a second encryption key, the private key configured to decrypt the first encryption secret;
   at the second server, generate the second encryption key from a second encryption secret unknown by the user system and the application server;
   at the second server, decrypt the private key with the second encryption key;
   at the second server, decrypt the first encryption secret with the decrypted private key;
   at the second server, re-encrypt the first encryption secret by combining the first encryption secret with a third encryption secret unknown and not accessible by the user system and the application server to prevent decryption by the application server; and
   after the re-encryption of the first encryption secret, store the re-encrypted first encryption secret in a database as the first encryption key.

2. The database system of claim 1, the hardware processor further operable to:
   receive a request from the application server for the first encryption key to encrypt data received from the user system;
   obtain the first encryption secret stored in the database;
   generate the first encryption key from the first encryption secret and the third encryption secret; and
   send the first encryption key to the application server to encrypt the data received from the user device.

3. The database system of claim 2, the hardware processor further operable to:

decrypt a master encryption secret and the re-encrypted first encryption secret based on the request for the first encryption key; and use the decrypted master encryption secret and the decrypted first encryption secret to generate the first encryption key.

4. The database system of claim 1, the hardware processor further operable to:

hash the decrypted first encryption secret; and send the hash of the first encryption secret to the application server to authenticate the first encryption secret with another hash of the first encryption secret sent by the user system.

5. The database system of claim 1, the hardware processor further operable to:

encrypt the second encryption secret and a master encryption secret to prevent decryption by the application server;

decrypt the second encryption secret and the master encryption secret based on the request from the application server to re-encrypt the first encryption secret; and use the decrypted second encryption secret and the decrypted master encryption secret to generate the second encryption key.

6. The database system of claim 1, wherein the private key is part of an asymmetric key-pair including a public key used by the user system to encrypt the first encryption secret and the private key used to decrypt the encrypted first encryption secret.

7. The database system of claim 6, the hardware processor further operable to send the second encryption key to the application server to encrypt the private key.

8. An application server for transferring a user encryption secret from a user system to a key derivation server, comprising:

a hardware processor; and memory storing one or more stored sequences of instructions which, when executed by the processor, cause the processor to:

from the application server, provide a public key from an asynchronous key-pair to the user system to encrypt the user encryption secret, the user encryption secret forming part of a first encryption key, the first encryption key including an encryption secret unknown and not accessible by the user system and the application server;

at the application server, receive a second encryption key from the key derivation server;

at the application server, encrypt a private key from the asynchronous key-pair with the second encryption key;

at the application server, delete the second encryption key to prevent decryption of the private key by the application server;

at the application server, receive the encrypted user encryption secret from the user system;

from the application server, send a re-encryption request to the key derivation server including the encrypted user encryption secret, the encrypted private key, and a key encryption secret unknown by the user system and the application server to generate the second encryption key;

at the application server, receive the user encryption secret re-encrypted by the key derivation server; and after the re-encrypted user encryption secret is received, store the re-encrypted user encryption secret in a database.

9. The application server of claim 8, wherein sending the re-encryption request causes the key derivation server to:

generate the second encryption key from the key encryption secret;

use the second encryption key to decrypt the private key;

use the decrypted private key to decrypt the user encryption secret; and re-encrypt the user encryption secret.

10. The application server of claim 8, further comprising instructions operable to:

receive encrypted user encryption secrets from different user systems;

send re-encryption requests for the user encryption secrets to the key derivation servers;

receive re-encrypted user encryption secrets from the key derivation server; and store the re-encrypted user encryption secrets for the different user systems in the database.

11. The application server of claim 8, wherein:

the first encryption key is derived from the user encryption secret and a master encryption secret; and the user encryption secret and the master secret are encrypted by the key derivation server to prevent decryption by the application server.

12. The application server of claim 8, wherein:

the second encryption key is derived from the key encryption secret and a master encryption secret; and the key encryption secret and the master encryption secret are encrypted by the key derivation server to prevent decryption by the application server.

13. The application server of claim 8, further comprising instructions operable to:

receive a request from the user system to encrypt data;

send the re-encrypted user encryption secret to the key derivation server to generate the first encryption key;

receive the first encryption key back from the encryption sever;

encrypt the data with the first encryption key; and delete the first encryption key to prevent the application server from decrypting the data without the first encryption key provided by the key derivation server.

14. The application server of claim 8, further comprising instructions operable to:

receive a first hash of unencrypted user encryption secret from the user system;

receive a second hash of the unencrypted user encryption secret from the key derivation server; and store the re-encrypted user encryption secret in the database system and notify the user system the user encryption secret was successfully stored in the database when the first hash matches the second hash.

15. A key derivation server for re-encrypting a user encryption secret generated by a user system and sent to an application server, comprising:

a hardware processor; and memory storing one or more stored sequences of instructions which, when executed by the processor, cause the processor to:

at the key derivation server, receive a request to re-encrypt a user encryption secret, the user encryption secret encrypted with a public key from an asynchronous key-pair and forming part of a first encryption key, the first encryption key including an encryption secret unknown by the user system and the application server;

at the key derivation server, generate a second encryption key from a key encryption secret unknown by the user system and the application server;

at the key derivation server, use the second encryption key to decrypt a private key from the asynchronous key-pair;

at the key derivation server, use the decrypted private key to decrypt the user encryption secret;

at the key derivation server, re-encrypt the user encryption secret; and after the user encryption secret is re-encrypted, store the re-encrypted user encryption secret in a database.

16. The key derivation server of claim 15, wherein the instructions further cause the processor to:

receive the re-encryption request from an application server;

re-encrypt the user encryption secret to prevent decryption by the application server; and send the re-encrypted user encryption secret to the application server for storing in a database system.

17. The key derivation server of claim 16, wherein the instructions further cause the processor to:

generate the second encryption key from the key encryption secret and a master encryption secret; and encrypt the key encryption secret and the master encryption secret to prevent decryption by the application server.

18. The key derivation server of claim 16, wherein the instructions further cause the processor to:

receive a request from the application server to encrypt data received from the user system;

receive the re-encrypted user encryption secret from the application server;

decrypt the re-encrypted user encryption secret;

generate the first encryption key from the decrypted user encryption secret; and send the first encryption key to the application server to encrypt the data received from the user system.

19. The key derivation server of claim 18, further comprising instructions operable to:

generate the first encryption key from the user encryption secret and a master encryption secret; and re-encrypt the user encryption secret to prevent decryption by the application server; and encrypt the master encryption secret to prevent decryption by the application server.

20. The key derivation server of claim 16, further comprising instructions operable to send the second encryption key to the application server to encrypt the private key, wherein the application server deletes the second encryption key after encrypting the private key.

* * * * *